(12) United States Patent
Brown et al.

(10) Patent No.: US 6,599,460 B1
(45) Date of Patent: Jul. 29, 2003

(54) PREVENTION OF VOID-BASED-IRREGULARITY FORMATION IN THIN-WALL, INJECTION-MOLDED PLASTIC PRODUCT

(75) Inventors: Paul Philip Brown, San Diego, CA (US); Jens Ole Sorensen, Grand Cayman (KY)

(73) Assignee: Sorensen Research and Develpoment Trust, San Diego, CA (US)

( * ) Notice: Subject to any disclaimer, the term of this patent is extended or adjusted under 35 U.S.C. 154(b) by 282 days.

(21) Appl. No.: 09/608,923

(22) Filed: Jul. 3, 2000

(51) Int. Cl.[7] .............................................. B29C 45/00
(52) U.S. Cl. ................. 264/328.12; 249/144; 425/577; 220/671; 220/675
(58) Field of Search ........................ 264/328.1, 328.12; 220/675, 671; 425/577; 249/142, 144

(56) References Cited

U.S. PATENT DOCUMENTS

| | | | |
|---|---|---|---|
| 3,532,291 A | * 10/1970 | Newman | ............... 242/118.31 |
| 3,679,119 A | 7/1972 | Copping | |
| 3,944,124 A | 3/1976 | Hexel | |
| 4,117,950 A | * 10/1978 | Allen | ........................ 220/782 |
| 4,140,828 A | 2/1979 | Copping | |
| 4,467,994 A | 8/1984 | Sorensen | |
| 4,519,557 A | * 5/1985 | Newman | .................... 220/675 |
| 4,622,002 A | 11/1986 | Bormuth | |
| 4,657,141 A | 4/1987 | Sorensen | |
| 4,743,420 A | 5/1988 | Dutt | |
| 4,789,326 A | 12/1988 | Sorensen | |
| 4,807,775 A | 2/1989 | Sorensen | |
| 4,844,405 A | 7/1989 | Sorensen | |
| 4,935,188 A | 6/1990 | Sorensen | |
| 4,959,005 A | 9/1990 | Sorensen | |
| 4,960,557 A | 10/1990 | Sorensen | |
| 5,008,064 A | 4/1991 | Sorensen | |
| 5,045,268 A | 9/1991 | Sorensen | |
| 5,145,630 A | 9/1992 | Schad | |
| 5,149,482 A | 9/1992 | Sorensen | |
| 5,262,112 A | 11/1993 | Sorensen | |
| 5,839,603 A | * 11/1998 | Smith et al. | ................. 220/380 |
| 5,858,286 A | 1/1999 | Brown et al. | |
| 5,879,613 A | 3/1999 | Brown et al. | |
| 6,003,720 A | * 12/1999 | Morimoto et al. | .......... 220/608 |

FOREIGN PATENT DOCUMENTS

| | | |
|---|---|---|
| EP | 0 362 648 A2 | 4/1990 |
| EP | 0 599 009 A1 | 6/1994 |
| JP | 53-21256 | 2/1978 |
| JP | 54-22481 | 2/1979 |
| JP | 54-148082 | 11/1979 |

* cited by examiner

*Primary Examiner*—Jill L. Heitbrink
(74) *Attorney, Agent, or Firm*—Edward W. Callan

(57) ABSTRACT

During injection molding of a thin-wall plastic product, such as a drink cup, the formation of void-based irregularities is prevented in a thin-wall portion of the product formed within a zone of a thin-wall cavity section that is located between adjoining flow chambers, in which zone the thickness of the thin-wall cavity section increases in the general direction of flow within the flow chambers adjoining such zone. Such void-based irregularity formation is prevented by dimensioning the mold cavity so that the thickness increases in such direction at less than a threshold rate. The flow chambers do not extend to a rim portion of the thin-wall cavity section; and the respective inscribed-sphere dimensions of the adjoining flow chambers within a terminal zone of the thin-wall cavity section adjacent a rim portion of the mold cavity are less than the respective inscribed-sphere dimensions of upstream portions of the adjoining flow chambers.

34 Claims, 3 Drawing Sheets

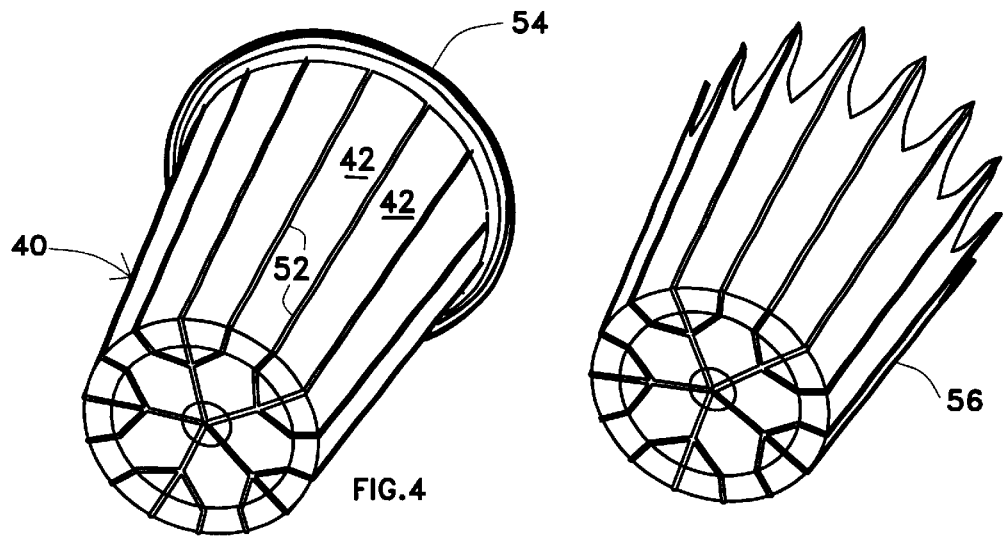
FIG.4
FIG.4A
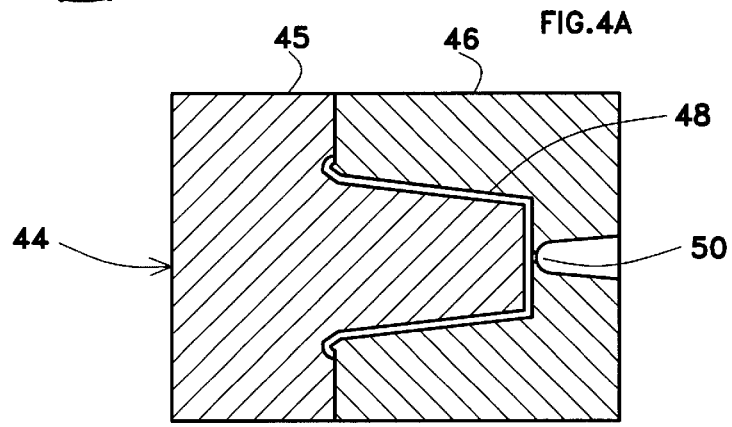
FIG.5
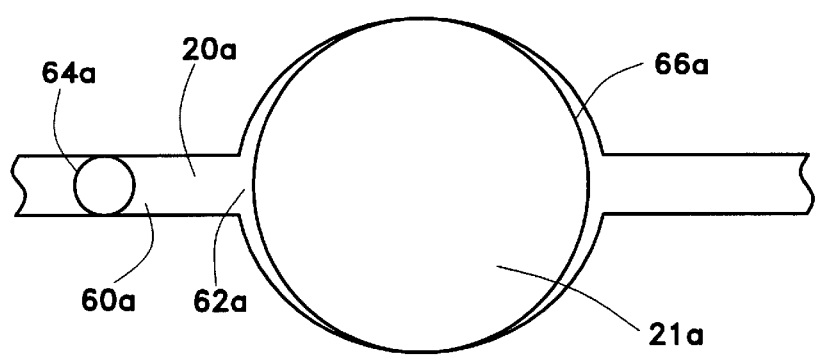
FIG.6A

PREVENTION OF VOID-BASED-IRREGULARITY FORMATION IN THIN-WALL, INJECTION-MOLDED PLASTIC PRODUCT

BACKGROUND AND SUMMARY OF THE INVENTION

The present invention generally pertains to injection molding of thin-wall plastic products and is particularly directed to preventing the formation of void-based irregularities in thin-wall portions of such products.

Some thin-wall portions of some plastic products are injection molded by using a mold cavity that includes flow chambers for directing injected fluid plastic material into thin-wall cavity sections located between the flow chambers to thereby form the thin-wall portions of the product.

For some products, it is desired to increase the thickness of the thin-cavity section in the general direction of flow within the flow chambers adjoining said zone. However, when such thickness is so increased, void-based irregularities sometimes occur in a thin-wall portion of the product that is formed by fluid plastic material directed into a zone of the thin-wall cavity section that is located between opposed flow chambers adjoining such zone because the injected fluid plastic material that is directed into such zone may surround one or more gaseous voids within such zone during the formation of the product, as shown in FIG. 1.

FIG. 1 illustrates a sequential flow-front pattern of directed plastic material within a region of a thin-wall cavity section 10 adjacent the downstream extremities of a pair of opposed flow chambers 12. The sequential flow-front pattern was determined by injecting different quantities of fluid plastic material into the flow chambers 12 and recording the extent of the resultant flow of such material directed into the thin-wall cavity section for each injection. It is seen that within a zone of the thin-wall cavity section 10 that is located between the flow chambers 12 the injected fluid plastic material that is directed into the thin-wall cavity section 10 surrounds a gaseous void 14 during the formation of the product. Consequently the thin-wall of the product includes an irregularity in the portion thereof that is formed in the zone of the thin-wall cavity section 12 in which the void 14 was surrounded by the directed fluid plastic material during the formation of the product. Such an irregularity may be manifested as a hole and/or a fragile and/or miscolored wall in such portion of the product. When the product is a container, such as a drink cup, a hole in the wall will enable fluid to leak from the container.

We have discovered that the formation of such void-based irregularities in the thin-wall portion of the product can be prevented within the zone of the thin-wall cavity section that is located between the flow chambers in which the thickness of the thin-wall cavity section increases in the general direction of flow within the flow chambers adjoining said zone by dimensioning the mold cavity so that said thickness increases in said direction at less than a threshold rate. When said thickness increases in said direction at a rate that equals or exceeds the threshold rate, such void-based irregularities usually occur. The threshold rate for a zone is determined empirically for each product, as described below in relation to the detailed description of the preferred embodiments.

The present invention provides a mold for injection-molding a product that includes at least one thin wall, comprising: a plurality of mold parts, which when combined define a mold cavity for forming the product and at least one gate from which fluid plastic material may be injected into the mold cavity; wherein the mold cavity includes at least one thin-wall cavity section and at least two opposed flow chambers that adjoin opposite edges of the thin-wall cavity section for directing injected fluid plastic material from exit positions of the said at least two opposed flow chambers into corresponding entrance positions of the thin-wall cavity section to thereby form at least one thin-wall portion of the product; wherein the at least one thin-wall cavity section includes at least one zone that is located between said at least two opposed flow a chambers; wherein within the at least one zone inscribed-sphere dimensions at each entrance position are smaller than inscribed-sphere dimensions at the corresponding exit position of the adjoining flow chamber; and wherein within the at least one zone the thickness of the at least one thin-wall cavity section increases in the general direction of flow within the flow chambers adjoining said zone, with said increase being at less than a threshold rate to thereby prevent injected fluid plastic material so directed into the at least one zone from at any time surrounding any gaseous void within the at least one zone. "Inscribed-sphere dimensions" are those dimensions in which a sphere can be fitted.

The present invention also provides a method of injection-molding a product that includes at least one thin wall, comprising the steps of:

(a) combining a plurality of mold parts to define a mold cavity for forming the product and at least one gate from which fluid plastic material may be injected into the mold cavity, wherein the mold cavity includes at least one thin-wall cavity section and at least two opposed flow chambers that adjoin opposite edges of the thin-wall cavity section for directing injected fluid plastic material from exit positions of the said at least two opposed flow chambers into corresponding entrance positions of the at least one thin-wall cavity section to thereby form at least one thin-wall portion of the product, wherein the at least one thin-wall cavity section includes at least one zone that is located between said at least two opposed flow chambers, and wherein within the at least one zone inscribed-sphere dimensions at each entrance position are smaller than inscribed-sphere dimensions at the corresponding exit position of the adjoining flow chamber; and (b) injecting fluid plastic material from the gate into the mold cavity to form the product;

wherein step (a) comprises combining mold parts that define a said mold cavity in which within said at least one zone of the at least one thin-wall cavity section the thickness of the at least one thin-wall cavity section increases in the general direction of flow within the flow chambers adjoining said zone, with said increase being at less than a threshold rate to thereby prevent injected fluid plastic material so directed into the at least one zone from at any time surrounding any gaseous void within the at least one zone.

Additional features of the present invention are described with reference to the detailed description of the preferred embodiments.

BRIEF DESCRIPTION OF THE DRAWING

FIG. 2 is drawn approximately to scale.

FIG. 4 is a perspective view of a drink-cup product injected molded in the mold of the present invention.

FIG. 4A is a perspective view of a portion of the product of FIG. 4 that is formed during an empirical determination of whether the rate of increase of the thickness of a thin-wall cavity section is below the threshold rate at which void-based irregularity formation is consistently prevented.

FIG. 5 is a sectional view of a mold in which the mold parts define a cavity section for molding the drink-cup product shown in FIG. 4.

FIG. 6A is a sectional view illustrating the respective inscribed-sphere dimensions in one embodiment of the mold cavity at an entrance position of a thin-wall cavity section and a corresponding exit position of an adjoining flow chamber, as seen along lines 6—6 in FIG. 2.

DETAILED DESCRIPTION

Figure 1:
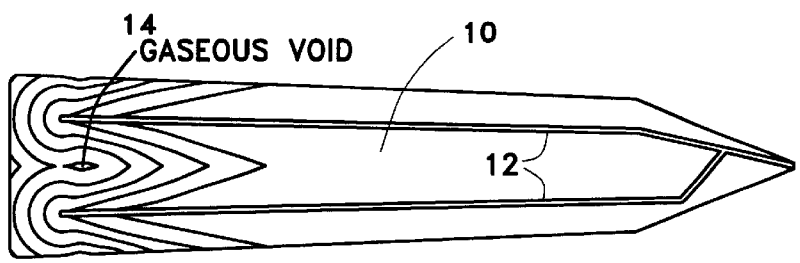
FIG. 1 illustrates a sequential flow-front pattern of directed plastic material within a region of a thin-wall cavity section in which a void is surrounded by such material during the formation of a thin-wall portion of a product within the thin-wall cavity section.
Figure 2:
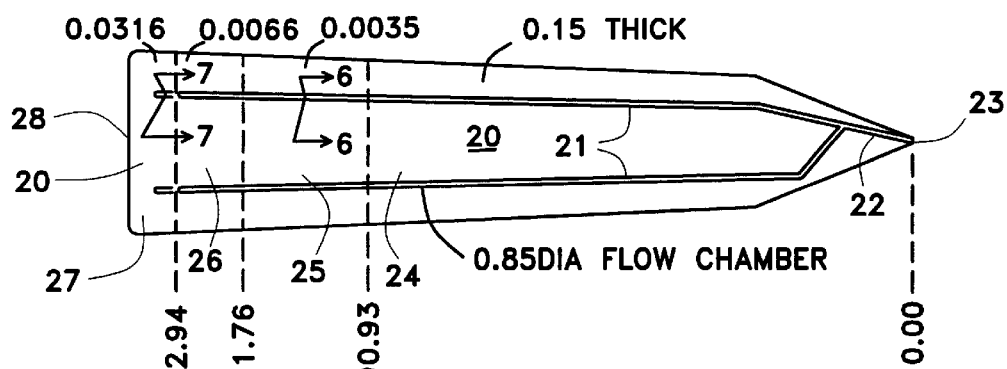
FIG. 2 shows exemplary dimensions of a preferred embodiment of a thin-wall cavity section defined by a mold according to the present invention.

Referring to FIG. 2, a preferred embodiment of a mold cavity defined by a mold according to the present invention includes a thin-wall cavity section 20 and a pair of opposing flow chambers 21 adjoining opposite sides of the cavity section 20 for directing injected fluid plastic material from exit positions of the two opposed flow chambers 21 into corresponding entrance positions of the thin-wall cavity section 20 to thereby form a thin-wall portion of an injection molded product. The pair of opposing flow chambers 21 extend from a feeding flow chamber 22 that is coupled to a gate 23 defined by the mold.

An exemplary preferred embodiment of a thin-wall cavity section 20 for forming a thin-wall portion of an injection molded plastic product is dimensioned as shown in FIG. 2. The material used for this exemplary embodiment was polypropylene. The thin-wall cavity section 20 includes an initial zone 24, a first intermediate zone 25, a second intermediate zone 26 and a terminal zone 27. The terminal zone 27 extends to a rim portion 28 of the mold cavity at which a rim of a thin-wall portion of a product is formed. The dividing line between the initial zone 24 and the first intermediate zone 25 is 90.35 mm. from the gate 23. The dividing line between the first intermediate zone 25 and a second intermediate zone 26 is 111.76 mm. from the gate 23. The dividing line between the second intermediate zone 26 and the terminal zone 27 is 122.94 mm. from the gate 23. The initial zone 24, the first intermediate zone 25 and the second intermediate zone 26 are located completely between the pair of opposing flow chambers 21. Neither of the pair of opposing flow chambers 21 extends to the rim portion 28, whereby a substantial portion of the terminal zone 27 is not located between the opposing pair of flow chambers 21. The prevention of formation of void-based irregularities in the terminal zone 27 is enhanced by not extending either of the pair of opposing flow chambers 21 to the rim portion 28.

The formation of void-based irregularities in the terminal zone 27 beyond the downstream extremities of the flow chambers 21 may not be a problem when they occur very close to a rim portion 28.

In the initial zone 24, the thin-wall cavity section 20 has a uniform thickness of 0.15 mm. In the first intermediate zone 25, the thickness of the at least one thin-wall cavity section 20 increases in the general direction of flow within the flow chambers 21 adjoining the first intermediate zone 25 at a rate of 0.0035. In the second intermediate zone 26, the thickness of the at least one thin-wall cavity section 20 increases in the general direction of flow within the flow chambers 21 adjoining the second intermediate zone 26 at a rate of 0.0066. In the terminal zone 27, the thickness of the at least one thin-wall cavity section 20 increases in the general direction of flow within the flow chambers 21 closest to the terminal zone 27 at a rate of 0.0316. Each of the opposing flow chambers 21 adjoining the initial zone 24, the first intermediate zone 25 and the second intermediate zone 26 has a diameter of 0.85 mm. Approaching the downstream extremities of the opposed flow chambers 21, the respective inscribed-sphere dimensions of the flow chambers 21 are less than the respective inscribed-sphere dimensions of upstream portions of the adjoining flow chambers 21. Such decrease in the respective inscribed-sphere dimensions of the flow chamber 21 further enhances prevention of formation of void-based irregularities in the terminal zone 27.

Figure 3:
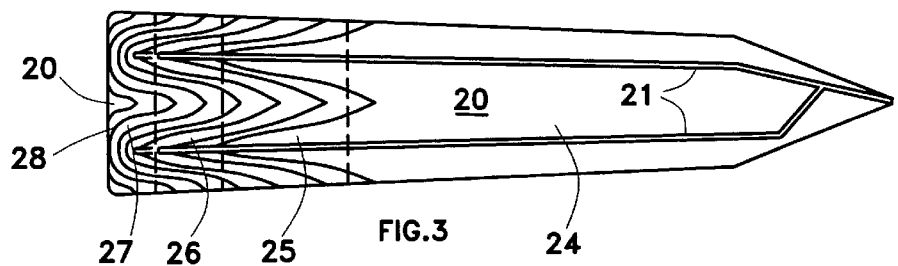
FIG. 3 illustrates a sequential flow-front pattern of directed plastic material within the thin-wall cavity section shown in FIG. 2.

Referring to FIG. 3, which illustrates a sequential flow-front pattern of directed plastic material within the thin-wall cavity section shown in FIG. 2, it is seen that the injected fluid plastic material that is directed into the thin-wall cavity section 20 does not at any time surround any gaseous void within any zone of the thin-wall section 20 that is located between the pair of opposing flow chambers 21 (including zones 24, 25, 26 and the portion of zone 27 that is located between the opposing flow chambers 21).

A drink cup 40, as shown in FIG. 4, having a plurality of thin-wall portions 42 was injected molded by the method of the present invention in a mold 44 according to the present invention, as shown in FIG. 5. The mold 44 includes a plurality of mold parts 45, 46, which when combined define a mold cavity 48 for forming the drink-cup 40 and a gate 50 from which fluid plastic material is injected into the mold cavity 48. The mold cavity 48 includes a plurality of thin-wall cavity sections 20, as shown in FIG. 2, and a plurality of adjoining opposed flow chambers 21 at opposite edges of each thin-wall cavity section 20. The thin-wall portions 42 of the drink cup 40 are formed in the thin-wall cavity sections 20. The drink cup 40 also includes ridges 52, which are formed in the flow chambers 21 of the mold cavity 48. The ridges 52 do not extend to a rim 54 of the cup 40. Each thin-wall cavity section 20 of the mold cavity 48 includes an initial zone 24, a first intermediate zone 25, a second intermediate zone 26 and a terminal zone 27, which are located and dimensioned as described above with reference to FIG. 2.

The threshold rate of increase in the thickness of the thin-wall cavity section 20 within each of the first intermediate zone 25, the second intermediate zone 26 and the terminal zone 27 below which void-based irregularity formation between the adjoining flow chambers 21 is prevented within all such zones 25, 26, 27 was determined empirically by injection molding test strips generally corresponding to an individual common thin-wall portion 42 of the drink cup 40, with different quantities of fluid plastic material being injected into a mold cavity, such as shown in FIG. 2, in which the rate of increase in the thickness is varied for each such zone 25, 26, 27 separately, and observing the respective rates of increase of the thickness within each zone 25, 26, 27 at which void-based irregularity formation is or is not prevented.

The dimensions of the mold cavity 48 were initially selected in accordance with such test-strip determinations. Partial test products 56, such as shown in FIG. 4A, were then injected molded with different quantities of fluid plastic material being injected into the mold cavity 48 to determine whether the respective rates of increase of the thickness within each of the first intermediate zone 25, the second intermediate zone 26 and the terminal zone 27 of the thin-wall cavity section 20 that were determined by observing the test strips were such that void-based irregularity formation between the adjoining flow chambers 21 in each of the zones 25, 26, 27 was consistently prevented. When observation of the partial test products 56 reveals that void-based irregularity formation is not consistently prevented, the rate of increase in the thickness is reduced in the zone or zones in which void-based irregularity formation is not consistently prevented; and further test strips and partial test products 56 are injection molded for further observation.

Figure 6B:
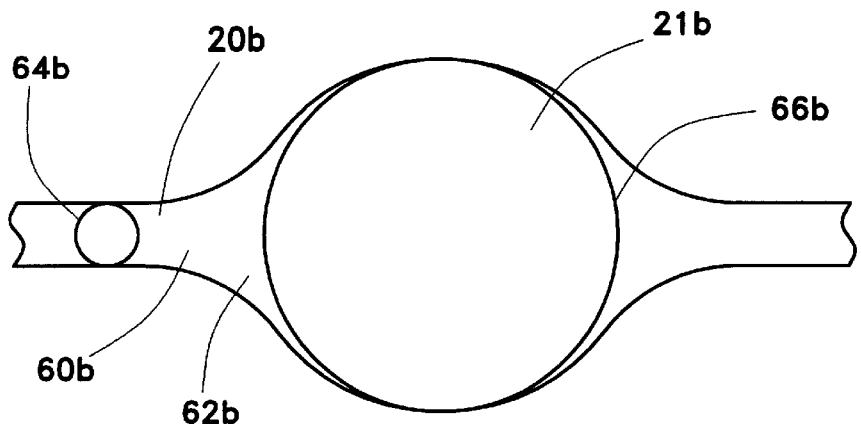
FIG. 6B is a sectional view illustrating the respective inscribed-sphere dimensions in another embodiment of the mold cavity at an entrance position of a thin-wall cavity section and a corresponding exit position of an adjoining flow chamber, as seen approximately along lines 6—6 in FIG. 2.
Figure 6C:
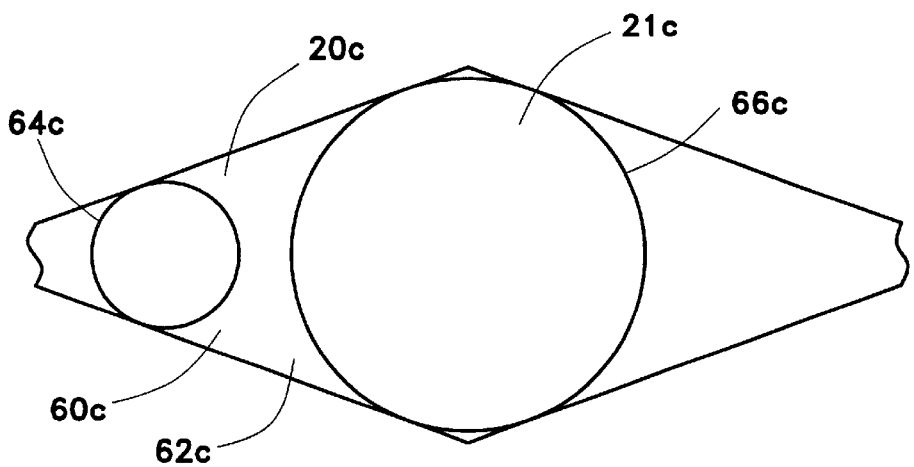
FIG. 6C is a sectional view illustrating the respective inscribed-sphere dimensions in still another embodiment of the mold cavity at an entrance position of a thin-wall cavity section and a corresponding exit position of an adjoining flow chamber, as seen approximately along lines 6—6 in FIG. 2.

FIGS. 6A, 6B and 6C illustrate the respective inscribed-sphere dimensions at an entrance position of a thin-wall cavity section and a corresponding exit position of an adjoining flow chamber in three alternative embodiments of the mold cavity 48.

In the mold cavity of FIG. 6A, the entrance position 60a of the thin-wall cavity section 20a is of approximately uniform thickness in a direction normal to the direction of flow within the adjoining flow chamber 21a; the cross-section of the flow chamber 21a is circular in the direction normal to the direction of flow within the flow chamber 21a; and here is a sharp transition between the exit position 62a of the flow chamber 21a and the entrance position 60a of the thin-wall cavity section 20a. Injected fluid plastic material is directed from the exit position 62a of the flow chamber 21a into the corresponding entrance position 60a of the thin-wall cavity section 20a; and the inscribed-sphere dimension 64a at the entrance position 60a is smaller than the inscribed-sphere dimension 66a at the corresponding exit position 62a of the adjoining flow chamber 21a.

In the mold cavity of FIG. 6B, the entrance position 60b of the thin-wall cavity section 20b is of approximately uniform thickness in a direction normal to the direction of flow within the adjoining flow chamber 21b; the cross-section of the flow chamber 21b is oval in the direction normal to the direction of flow within the flow chamber 21a; and there is a tapered transition between the exit position 62b of the flow chamber 21b and the entrance position 60b of the thin-wall cavity section 20b. Injected fluid plastic material is directed from the exit position 62b of the flow chamber 21b into the corresponding entrance position 60b of the thin-wall cavity section 20b; and the inscribed-sphere dimension 64b at the entrance position 60b is smaller than the inscribed-sphere dimension 66b at the corresponding exit position 62b of the adjoining flow chamber 21b.

In the mold cavity of FIG. 6C, the thickness of the entrance position 60c of the thin-wall cavity section 20c decreases in a direction away from and normal to the direction of flow within the adjoining flow chamber 21c. Injected fluid plastic material is directed from the exit position 62c of the flow chamber 21c into the corresponding entrance position 60c of the thin-wall cavity section 20c; and the inscribed-sphere dimension 64c at the entrance position 60c is smaller than the inscribed-sphere dimension 66c at the corresponding exit position 62c of the adjoining flow chamber 21c.

Figure 7:
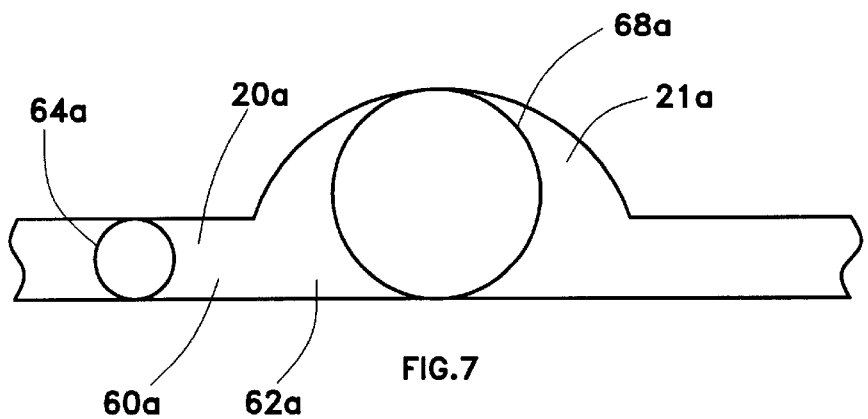
FIG. 7 is a sectional view illustrating the respective inscribed-sphere dimensions in an embodiment of the mold cavity at an entrance position of a thin-wall cavity section and a corresponding exit position of an adjoining flow chamber near the downstream extremity of the flow chamber, as seen along lines 7—7 in FIG. 2.

FIG. 7 illustrates the respective inscribed-sphere dimensions at an entrance position 60a of the thin-wall cavity section 20a and a corresponding exit position 62a of the adjoining flow chamber 21a near the downstream extremity of the flow chamber 21a in an embodiment of the mold cavity corresponding to that shown in FIG. 6A. The entrance position 60a of the thin-wall cavity section 20a is of approximately uniform thickness in a direction normal to the direction of flow within the adjoining flow chamber 21a; the cross-section of the flow chamber 21a, (which resides within the generally concave surface of the mold cavity 48) is semicircular in the direction normal to the direction of flow within the flow chamber 21a; the flow chamber 21a has a smaller inscribed-sphere dimension than in the upstream portion of the flow chamber 21a shown in FIG. 6A; and there is a sharp transition between the exit position 62a of the flow chamber 21a and the entrance position 60a of the thin-wall cavity section 20a. Injected fluid plastic material is directed from the exit position 62a of the flow chamber 21a into the corresponding entrance position 60a of the thin-wall cavity section 20a; and the inscribed-sphere dimension 64a at the entrance position 60a is smaller than the inscribed-sphere dimension 68a at the corresponding exit position 62a of the adjoining flow chamber 21a.

In additional alternative embodiments (not shown), (a) at least one of the adjoining flow chambers does not extend from the gate either directly or via one or more connected intervening flow chambers; (b) the direction of flow within an elongated flow chamber is not necessarily lengthwise; (c) opposed flow chambers do not necessarily direct fluid plastic material toward a common position between the opposed flow chambers; (d) flow chambers may be curved and/or shaped in any manner; (e) thin-wall cavity sections need not be relatively flat or conical; (f) a thin-wall cavity section may be interposed between at least one flow chamber and the gate; and (g) meld chambers, such as described in U.S. Pat. No. 4,844,405, may be disposed within the thin cavity region between the opposed adjoining flow chambers to further enhance prevention of formation of void-based irregularities in those zones of the thin-wall section 20 that are located between the pair of opposing flow chambers 21.

The advantages specifically stated herein do not necessarily apply to every conceivable embodiment of the present invention. Further, such stated advantages of the present invention are only examples and should not be construed as the only advantages of the present invention.

While the above description contains many specificities, these should not be construed as limitations on the scope of the present invention, but rather as examples of the preferred embodiments described herein. Other variations are possible and the scope of the present invention should be determined not by the embodiments described herein but rather by the claims and their legal equivalents.

We claim:

1. A method of injection-molding a product that includes at least one thin wall, comprising the steps of:
   (a) combining a plurality of mold parts to define a mold cavity for forming the product and at least one gate from which fluid plastic material may be injected into the mold cavity, wherein the mold cavity includes at least one thin-wall cavity section and at least two opposed flow chambers that adjoin opposite edges of the thin-wall cavity section for directing injected fluid plastic material from exit positions of the said at least two opposed flow chambers into corresponding entrance positions of the at least one thin-wall cavity section to thereby form at least one thin-wall portion of the product, wherein the at least one thin-wall cavity section includes at least one zone that is located between said at least two opposed flow chambers, and wherein within the at least one zone inscribed-sphere dimensions at each entrance position are smaller than inscribed-sphere dimensions at the corresponding exit position of the adjoining flow chamber; and
   (b) injecting fluid plastic material from the gate into the mold cavity to form the product;
   wherein step (a) comprises combining mold parts that define a said mold cavity in which within said at least one zone of the at least one thin-wall cavity section the thickness of the at least one thin-wall cavity section increases in the general direction of flow within the flow chambers adjoining said zone, with said increase being at less than a threshold rate to thereby prevent injected fluid plastic material so directed into the at least one zone from at any time surrounding any gaseous void within the at least one zone.

2. A method according to claim 1, wherein the mold cavity includes a plurality of said thin-wall cavity sections and a plurality of said adjoining at least two opposed flow chambers at opposite edges of each thin-wall cavity section; and
   wherein each thin-wall cavity section includes at least one said zone located between the adjoining at least two opposed flow chambers, in which inscribed-sphere dimensions at each entrance position are smaller than inscribed-sphere dimensions at the corresponding exit position of the adjoining flow chamber; and in which the thickness of the thin-wall cavity section increases in the direction of flow within the adjoining flow chambers at less than said threshold rate.

3. A method according to claim 2, wherein the mold cavity defines a hollow product.

4. A method according to claim 3, wherein the mold cavity defines a drink cup.

5. A method according to claim 2, wherein each at least one thin-wall cavity section extends to a rim portion of the mold cavity in which a rim of the product is formed, and
   wherein none of at least two opposed flow chambers adjoining the at least one thin-wall cavity section extend to the rim portion.

6. A method according to claim 5, wherein within a terminal zone of the at least one thin-wall cavity section adjacent the rim portion of the mold cavity, the respective inscribed-sphere dimension of the adjoining flow chambers are less than the respective inscribed-sphere dimension of upstream portions of the adjoining flow chambers.

7. A method according to claim 2, wherein within a terminal zone of the at least one thin-wall cavity section adjacent a rim portion of the mold cavity in which a rim of the product is formed, the respective inscribed-sphere dimension of the adjoining flow chambers are less than the respective inscribed-sphere dimension of upstream portions of the adjoining flow chambers.

8. A method according to claim 1, wherein within a terminal zone of the at least one thin-wall cavity section adjacent a rim portion of the mold cavity in which a rim of the product is formed, the respective inscribed-sphere dimension of the adjoining flow chambers are less than the respective inscribed-sphere dimension of upstream portions of the adjoining flow chambers.

9. A method according to claim 1, wherein each at least one thin-wall cavity section extends to a rim portion of the mold cavity in which a rim of the product is formed, and
   wherein none of at least two opposed flow chambers adjoining the at least one thin-wall cavity section extend to the rim portion.

10. A method according to claim 9, wherein within a terminal zone of the at least one thin-wall cavity section adjacent the rim portion of the mold cavity, the respective inscribed-sphere dimension of the adjoining flow chambers are less than the respective inscribed-sphere dimension of upstream portions of the adjoining flow chambers.

11. A method according to claim 9, wherein within a terminal zone of the at least one thin-wall cavity section adjacent the rim portion of the mold cavity, the thickness of the at least one thin-wall cavity section increases in the direction of flow within the closest portions of the adjoining flow chambers at a rate greater than the rate of increase within the at least one zone of the at least one thin-wall cavity section.

12. A method according to claim 11, wherein a portion of the terminal zone is located between the adjoining at least two opposed flow chambers.

13. A method according to claim 11, wherein within an intermediate zone of the at least one thin-wall cavity section that is located between the adjoining at least two opposed flow chambers and between the at least one zone and the terminal zone, the thickness of the thin-wall cavity section increases in the direction of flow within the adjoining at least two opposed flow chambers at a rate less than the threshold rate, greater than the rate of increase within the at least one zone and less than the rate of increase within the terminal zone.

14. A method according to claim 1, wherein within an initial zone of the thin-wall section between the adjoining at least two opposed flow chambers and upstream from the at least one zone, the thickness of the thin-wall section does not change in the direction of flow within the adjoining at least two opposed flow chambers.

15. A method according to claim 1, wherein the flow chambers are elongated in the direction in which injected plastic material is directed within the flow chambers.

16. A method according to claim 1, wherein at each entrance position, the thin-wall cavity section is of uniform thickness in a direction normal to the general direction of flow within the adjoining flow chamber.

17. A method according to claim 1, wherein the thickness of each entrance position of the thin-wall cavity section decreases in a direction away from and normal to the general direction of flow within the adjoining flow chamber.

18. A mold for injection-molding a product that includes at least one thin wall, comprising:
   a plurality of mold parts, which when combined define a mold cavity for forming the product and at least one gate from which fluid plastic material may be injected into the mold cavity;

wherein the mold cavity includes at least one thin-wall cavity section and at least two opposed flow chambers that adjoin opposite edges of the thin-wall cavity section for directing injected fluid plastic material from exit positions of the said at least two opposed flow chambers into corresponding entrance positions of the thin-wall cavity section to thereby form at least one thin-wall portion of the product;

wherein the at least one thin-wall cavity section includes at least one zone that is located between said at least two opposed flow chambers;

wherein within the at least one zone inscribed-sphere dimensions at each entrance position are smaller than inscribed-sphere dimensions at the corresponding exit position of the adjoining flow chamber; and wherein within the at least one zone the thickness of the at least one thin-wall cavity section increases in the general direction of flow within the flow chambers adjoining said zone, with said increase being at less than a threshold rate to thereby prevent injected fluid plastic material so directed into the at least one zone from at any time surrounding any gaseous void within the at least one zone.

19. A mold according to claim 1, wherein the mold cavity includes a plurality of said thin-wall cavity sections and a plurality of said adjoining at least two opposed flow chambers at opposite edges of each thin-wall cavity section; and wherein each thin-wall cavity section includes at least one said zone located between the adjoining at least two opposed flow chambers, in which inscribed-sphere dimensions at each entrance position are smaller than inscribed-sphere dimensions at the corresponding exit position of the adjoining flow chamber; and in which the thickness of the thin-wall cavity section increases in the direction of flow within the adjoining flow chambers at less than said threshold rate.

20. A mold according to claim 19, wherein the mold cavity defines a hollow product.

21. A mold according to claim 20, wherein the mold cavity defines a drink cup.

22. A mold according to claim 19, wherein each at least one thin-wall cavity section extends to a rim portion of the mold cavity in which a rim of the product is formed, and wherein none of at least two opposed flow chambers adjoining the at least one thin-wall cavity section extend to the rim portion.

23. A mold according to claim 22, wherein within a terminal zone of the at least one thin-wall cavity section adjacent the rim portion of the mold cavity, the respective inscribed-sphere dimension of the adjoining flow chambers are less than the respective inscribed-sphere dimension of upstream portions of the adjoining flow chambers.

24. A mold according to claim 19, wherein within a terminal zone of the at least one thin-wall cavity section adjacent a rim portion of the mold cavity in which a rim of the product is formed, the respective inscribed-sphere dimension of the adjoining flow chambers are less than the respective inscribed-sphere dimension of upstream portions of the adjoining flow chambers.

25. A mold according to claim 18, wherein within a terminal zone of the at least one thin-wall cavity section adjacent a rim portion of the mold cavity in which a rim of the product is formed, the respective inscribed-sphere dimension of the adjoining flow chambers are less than the respective inscribed-sphere dimension of upstream portions of the adjoining flow chambers.

26. A mold according to claim 18, wherein each at least one thin-wall cavity section extends to a rim portion of the mold cavity in which a rim of the product is formed, and wherein none of at least two opposed flow chambers adjoining the at least one thin-wall cavity section extend to the rim portion.

27. A mold according to claim 26, wherein within a terminal zone of the at least one thin-wall cavity section adjacent the rim portion of the mold cavity, the respective inscribed-sphere dimension of the adjoining flow chambers are less than the respective inscribed-sphere dimension of upstream portions of the adjoining flow chambers.

28. A mold according to claim 26, wherein within a terminal zone of the at least one thin-wall cavity section adjacent the rim portion of the mold cavity, the thickness of the at least one thin-wall cavity section increases in the direction of flow within the closest portions of the adjoining flow chambers at a rate greater than the rate of increase within the at least one zone of the at least one thin-wall cavity section.

29. A mold, according to claim 28, wherein a portion of the terminal zone is located between the adjoining at least two opposed flow chambers.

30. A mold according to claim 28, wherein within an intermediate zone of the at least one thin-wall cavity section that is located between the adjoining at least two opposed flow chambers and between the at least one zone and the terminal zone, the thickness of the thin-wall cavity section increases in the direction of flow within the adjoining at least two opposed flow chambers at a rate less than the threshold rate, greater than the rate of increase within the at least one zone and less than the rate of increase within the terminal zone.

31. A mold according to claim 18, wherein within an initial zone of the thin-wall section between the adjoining at least two opposed flow chambers and upstream from the at least one zone, the thickness of the thin-wall section does not change in the direction of flow within the adjoining at least two opposed flow chambers.

32. A mold according to claim 18, wherein the flow chambers are elongated in the direction in which injected plastic material is directed within the flow chambers.

33. A mold according to claim 18, wherein at each entrance position, the thin-wall cavity section is of uniform thickness in a direction normal to the general direction of flow within the adjoining flow-chamber.

34. A mold according to claim 18, wherein the thickness of each entrance position of the thin-wall cavity section decreases in a direction away from and normal to the general direction of flow within the adjoining flow chamber.

* * * * *